No. 844,469. PATENTED FEB. 19, 1907.
T. C. PROUTY.
MECHANICAL MOVEMENT.
APPLICATION FILED NOV. 19, 1906.
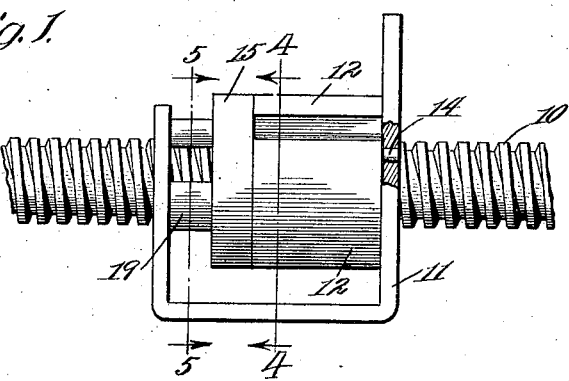
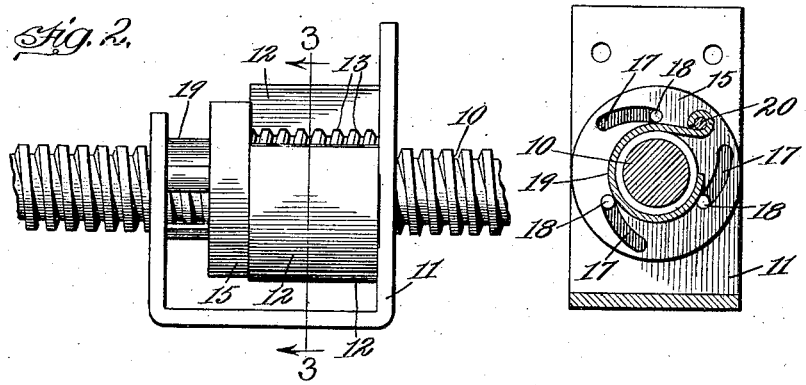
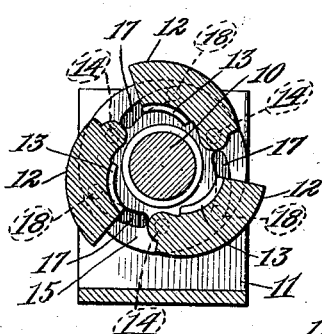
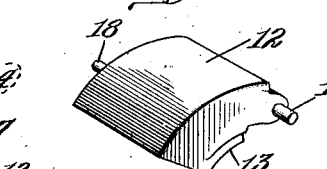
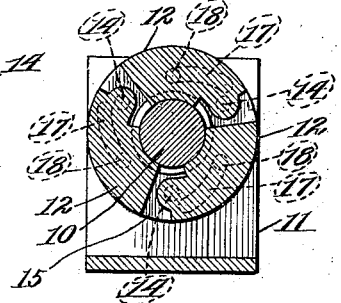
Witnesses: Inventor: Theodore C. Prouty.

UNITED STATES PATENT OFFICE.

THEODORE C. PROUTY, OF AURORA, ILLINOIS, ASSIGNOR TO WILCOX MANUFACTURING COMPANY, OF AURORA, ILLINOIS, A CORPORATION OF ILLINOIS.

MECHANICAL MOVEMENT.

No. 844,469.     Specification of Letters Patent.     Patented Feb. 19, 1907.

Application filed November 19, 1906. Serial No. 344,063.

*To all whom it may concern:*

Be it known that I, THEODORE C. PROUTY, a citizen of the United States, residing at Aurora, in the county of Kane, State of Illinois, have invented certain new and useful Improvements in Mechanical Movements, of which the following is a specification, reference being had to the accompanying drawings.

This invention relates to mechanism for enabling a screw-threaded rod that fits within a fixed interiorly-screw-threaded member to be moved quickly in a longitudinal direction and without axial movement. Such mechanism is adapted for use in connection with vises, drills, and many other articles, and hence in view of its applicability to many and varied uses I have not illustrated it in connection with any single machine or tool.

The objects of my invention are to provide mechanism of the general character above specified that will be simple in construction, that will possess great strength, and that can be readily and easily operated. I attain these objects by the devices and combinations of devices illustrated in the accompanying drawings and hereinafter specifically described.

In the drawings, Figure 1 is a side elevation of my improved mechanism, the expansible nut being shown closed, so that the screw passing through it can be moved only by an axial movement. Fig. 2 is a view similar to Fig. 1, but showing the nut raised away from the screw, or opened, so that the screw may be freely moved longitudinally by an endwise push or pull. Fig. 3 is a vertical section taken at line 3 3 of Fig. 2. Fig. 4 is a vertical section taken at line 4 4 of Fig. 1. Fig. 5 is a vertical section taken at line 5 5 of Fig. 1. Fig. 6 is a detail, being a perspective view of one of the segmental members of the expansible nut. Fig. 7 is a detail, being a perspective view of the ring or collar to which the friction member is attached and which, through the engagement of pins on the separate members of the expansible nut with cam-slots in the said ring or collar, moves said nut members toward or away from the screw-threaded rod.

Referring to the several figures of the drawings, in which corresponding parts are indicated by the same reference-numerals, 10 indicates the operating screw-threaded rod. 11 indicates a supporting-frame through which the rod 10 is adapted to freely move. In the form of construction shown this frame is approximately U-shaped; but such shape may be varied from, as the support may be made to suit the use to which the mechanism is applied.

12 indicates segments which, taken together, constitute an expansible nut. This nut is of considerable width, and as each segment of the nut is threaded on its inner face with threads that correspond to the threads on the rod 10 with which they coöperate it will be seen that when the segments are in place on the rod, as in Fig. 1, a long bearing of the nut on the rod is had, and that consequently the two parts—the nut and the rod—are strongly united to each other. The strength of the union between these two parts will be further appreciated when it is noted that the nut when closed, as in Fig. 1, practically completely surrounds the rod and that therefore its screw-threads engage the screw-threads of the rod nearly all the way around the rod. This is illustrated by Fig. 4. The screw-threads on the several segmental members of the nut are indicated by 13.

14 indicates a pivot extending laterally from one side and near one end of each segmental member 12 of the nut, each of said pivots being secured in the support 11. Such pivotal connection of each of the segmental members is clearly indicated in dotted lines in Figs. 3 and 4.

15 is a ring or collar having a central unthreaded opening 16, through which the rod 10 can freely move. It is located on the rod next to the expansible nut, and formed in it are a plurality of cam-slots, corresponding in number to the number of the segmental members 12—three in the construction shown. These cam-slots are indicated by 17.

18 indicates a pin extending laterally from one of the side faces of each segmental member 12 and adapted to project into one of the said cam-slots 17. These pins 18 are on the opposite faces of the segmental members from the pivots 14 and are located near the forward or free edges of such members 12.

19 indicates a friction device adapted to at all times frictionally engage the screw-threaded rod 10, said friction device being connected with the ring or collar and movable with such ring or collar in the very limited movement permitted, as explained hereinafter. In the construction shown this friction device 19 is in the form of a band bent to lie against and very nearly surround the rod 10, and it is connected with the ring or collar 15 by having one of its ends wrapped around a pin 20, projecting from the outer face of the ring or collar 15. (See Fig. 5.)

With the parts assembled as shown and the nut composed of the segmental members 12 closed, as in Fig. 1, and the support 11 made immovable the screw 10, which, of course, will be provided with a suitable handle, can be rotated in the usual manner to move it forward through the nut, and by reason of the screw engagement of the nut with almost the entire surface of the rod that is within the nut the engagement between the rod and nut will be a very strong one, indeed, affording almost as strong an engagement as if the nut were the usual solid one-piece nut. It is evident, therefore, that the screw can be put to very severe work without danger of breaking any of the parts. Now, when it is desired to give a quick longitudinal adjustment to the rod 10 and without rotating the rod to accomplish this a slight reverse turn or partial rotation is first given to the rod, the effect of which is, through the frictional engagement of the band 19 with the said rod, to cause said band to turn with the rod, and inasmuch as it is connected with the ring or collar 15 such ring or collar is also turned, this turning continuing until the outer ends of the cam-slots 17 are reached by the pins 18, that at all times project into them. By reason of the slots 18 being cam-shaped the segments 12, that form the nut, are of course turned on their respective pivots 14 into the position shown in Figs. 2 and 3, in which position their screw-threads 13 are entirely clear of the screw-threaded rod. With these nut members thus raised out of the way the rod 10 can be freely moved longitudinally in either direction, the resistance offered to such longitudinal movement by the friction of the band 19 being but slight and easily overcome. When the rod has thus been adjusted as needed and it is desired to again utilize its screw for applying power, a slight turn or rotation of the rod to the right (assuming the screw to be a right-handed one, as shown) will cause the ring or collar to turn with the rod to the limit allowed by the cam-slots 17, such turning, of course, drawing down the segmental members 12 of the nut into engagement again with the threaded rod. This turning of the collar or ring is due, as before, to the frictional engagement of the band 19 with the rod. Such frictional engagement of the band with the rod while strong enough to always compel a turning of the collar or ring to which it is attached within the limits permitted by the length of the slots 17 is not strong enough to interfere with the free axial rotation of the rod through the nut when the nut is closed nor with the straight longitudinal movement of such rod when making a quick adjustment when the nut is opened or expanded.

What I claim as my invention, and desire to secure by Letters Patent, is—

1. The combination with a support and a screw-threaded rod, of an expansible nut the members of which are movable into and out of engagement with said rod, and means frictionally engaging said rod and adapted through such frictional engagement to cause said nut to be moved into and out of engagement with the rod.

2. The combination with a support and a screw-threaded rod, of an expansible nut the members of which are separately pivoted to said support, and means frictionally engaging said rod and adapted through such frictional engagement to cause said nut to be moved into and out of engagement with the rod.

3. The combination with a support and a screw-threaded rod, of a member pivoted to said support and adapted to engage said rod, a cam device adapted to move said pivoted member into and out of engagement with the rod, and means carried by said cam device for frictionally engaging said rod.

4. The combination with a support and a screw-threaded rod, of a pivoted member movable into and out of engagement with said rod, a cam device adapted to move said pivoted member into and out of engagement with the rod, and a band connected with said cam device and frictionally engaging said rod.

5. The combination with a support and a screw-threaded rod, of a member pivoted at one end to said support and adapted to be moved into and out of engagement with said rod, a cam device located on said rod opposite the other end of said pivoted member, means for loosely connecting said pivoted member and cam device together, and means connected to said cam device for frictionally engaging said rod.

6. The combination with a support and a screw-threaded rod, of an expansible nut on the rod, said nut being composed of a plurality of sections, a cam device for expanding said nut by raising the several sections thereof out of engagement with the rod, and means carried by said cam device for frictionally engaging the rod.

7. The combination with a support and a screw-threaded rod, of an expansible nut on the rod, said nut being composed of a plurality of sections each pivotally connected to said support, a cam device for expanding said nut by turning the several sections thereof on their respective pivots, and means secured to said cam device for frictionally engaging the rod.

8. The combination with a support and a screw-threaded rod, of an expansible nut on the rod, said nut being composed of a plurality of sections each pivotally connected to said support, a cam device for expanding said nut by turning the several sections thereof on their respective pivots, and a friction-band attached to said cam device and bearing on said rod.

9. The combination with a support and a screw-threaded rod, of an expansible nut on the rod, said nut being composed of a plurality of sections each pivotally connected at one end to said support and each having a projecting pin on the other end, a collar or ring loose on said rod, said collar or ring having cam-shaped openings into which said pins project, and means carried by said collar or ring for frictionally engaging said rod.

10. The combination with a support and a screw-threaded rod, of an expansible nut on the rod, said nut being composed of a plurality of sections each pivotally connected at one end to said support and each having a projecting pin on the other end, a collar or ring loose on said rod, said collar or ring having cam-shaped openings into which said pins project, and a band connected to said collar or ring and frictionally engaging said rod.

THEODORE C. PROUTY

Witnesses:
 ALBERT H. ADAMS,
 WILLIAM H. DE BUSK.